(12) United States Patent
Tewari et al.

(10) Patent No.: US 8,645,419 B2
(45) Date of Patent: Feb. 4, 2014

(54) FUSION OF STRUCTURAL AND CROSS-FUNCTIONAL DEPENDENCIES FOR ROOT CAUSE ANALYSIS

(75) Inventors: Asim Tewari, Maharashtra (IN); Vineet R Khare, Bangalore (IN); Sugato Chakrabarty, Bangalore (IN)

(73) Assignee: GM Global Technology-Operations LLC, Detroit, MI (US)

( * ) Notice: Subject to any disclaimer, the term of this patent is extended or adjusted under 35 U.S.C. 154(b) by 329 days.

(21) Appl. No.: 13/114,092

(22) Filed: May 24, 2011

(65) Prior Publication Data

US 2012/0303662 A1   Nov. 29, 2012

(51) Int. Cl.
*G06F 7/00* (2006.01)
*G06F 17/30* (2006.01)

(52) U.S. Cl.
USPC .......................................................... 707/777

(58) Field of Classification Search
USPC .......................................... 707/777, 999.101
See application file for complete search history.

(56) References Cited

U.S. PATENT DOCUMENTS

| | | | |
|---|---|---|---|
| 2008/0004764 A1* | 1/2008 | Chinnadurai et al. | 701/29 |
| 2012/0277949 A1* | 11/2012 | Ghimire et al. | 701/31.4 |

* cited by examiner

*Primary Examiner* — Alexey Shmatov

(57) ABSTRACT

A method is provided for enhancing service diagnostics for root cause analysis of an identified problem in a vehicle. Service repair data of previously serviced vehicles is obtained from a memory storage device. The service data is compiled based on a service repair history for each vehicle. Each vehicle within the compiled service data having at least two service repairs performed within a predetermined period of time is identified. Combinations of parts serviced during each service repair are identified. A count is determined that indicates the number of times each combination appears in the compiled service data. The combinations having counts greater than a predetermined threshold are identified. A determination is made whether any of the combinations having counts greater than the predetermined threshold are present in the structural taxonomy database. A functional taxonomy database is updated by assigning the selected combinations to the function taxonomy database not present in the structural taxonomy database.

13 Claims, 3 Drawing Sheets

FUSION OF STRUCTURAL AND CROSS-FUNCTIONAL DEPENDENCIES FOR ROOT CAUSE ANALYSIS

BACKGROUND OF INVENTION

An embodiment relates generally to developing and enhancing service procedures and diagnostics.

Service repairs are performed by service providers, such as a service department at a dealership. The problem or symptoms relating to the problem are reported to a service technician who then attempts to diagnose and repair the vehicle. The service technician will utilize service diagnostics, service manuals, knowledge, and past experience to correctly identify the root cause of the problem.

A structural list of parts, components, and modules may be provided in a structural taxonomy database that illustrates structurally relationships among components; however, it is still up to the technician to identify a specific part from an exhaustive list that is causing the issue. However, the overabundance of possible choices may be burdensome to the technician. Moreover, there may be relationships that are not present in the structural taxonomy database because there may be a functional relationship between the parts as opposed to a structural relationship that is not identified in the structural list of parts.

SUMMARY OF INVENTION

An advantage of an embodiment is a diagnosis of a root cause of a problem for a serviced vehicle by utilizing a functional taxonomy database for identifying linking relationships between parts that may not be readily apparent by their structural relationship. The routine utilizes service repair history of serviced vehicles and identifies combinations of parts that are serviced for each vehicle. Parts that are serviced during different repairs for a vehicle but close to each other are considered. As result, parts in two subsequent repairs for a respective vehicle separated by not more than a predetermined time are considered. The count is tallied for each respective combination of all vehicles and is checked against a threshold count. If the count satisfies a threshold, then a structural taxonomy database is checked to see if the combination exists therein. If the combination does not exist in the structural taxonomy database, then the combination is added to the functional taxonomy database. As a result, the functional linking of the parts between the structural and functional taxonomy databases provide additional candidates that would otherwise not be obvious to the service technician as possible root causes from a structural perspective.

An embodiment contemplates a method of enhancing service diagnostics for root cause analysis of an identified problem in a vehicle by generating a functional taxonomy database that is utilized in cooperation with a structural taxonomy database. The structural taxonomy database identifies structural relationships between parts of a vehicle and the functional taxonomy database identifies functional relationships between parts of the vehicle. Service repair data of previously serviced vehicles is obtained from a memory storage device. The service data identifies parts serviced on the vehicle during a respective service repair. The service data is compiled based on a service repair history for each vehicle. Each vehicle within the compiled service data having at least two service repairs performed within a predetermined period of time is identified. Combinations of parts serviced during for each vehicle are identified. A count is determined that indicates the number of times each combination appears in the compiled service data for the identified vehicles having at least two service repairs. The combinations having counts greater than a predetermined threshold are identified. A determination is made whether any of the combinations having counts greater than the predetermined threshold are present in the structural taxonomy database. Only the combinations that are not present in the structural taxonomy database and have counts greater than the predetermined threshold are selected. A functional taxonomy database is updated by assigning the selected combinations to the function taxonomy database. The functional taxonomy database and the structural taxonomy database are made available to a service technician via a computer to assist the service technician in diagnosing the root cause.

DETAILED DESCRIPTION

Figure 1:
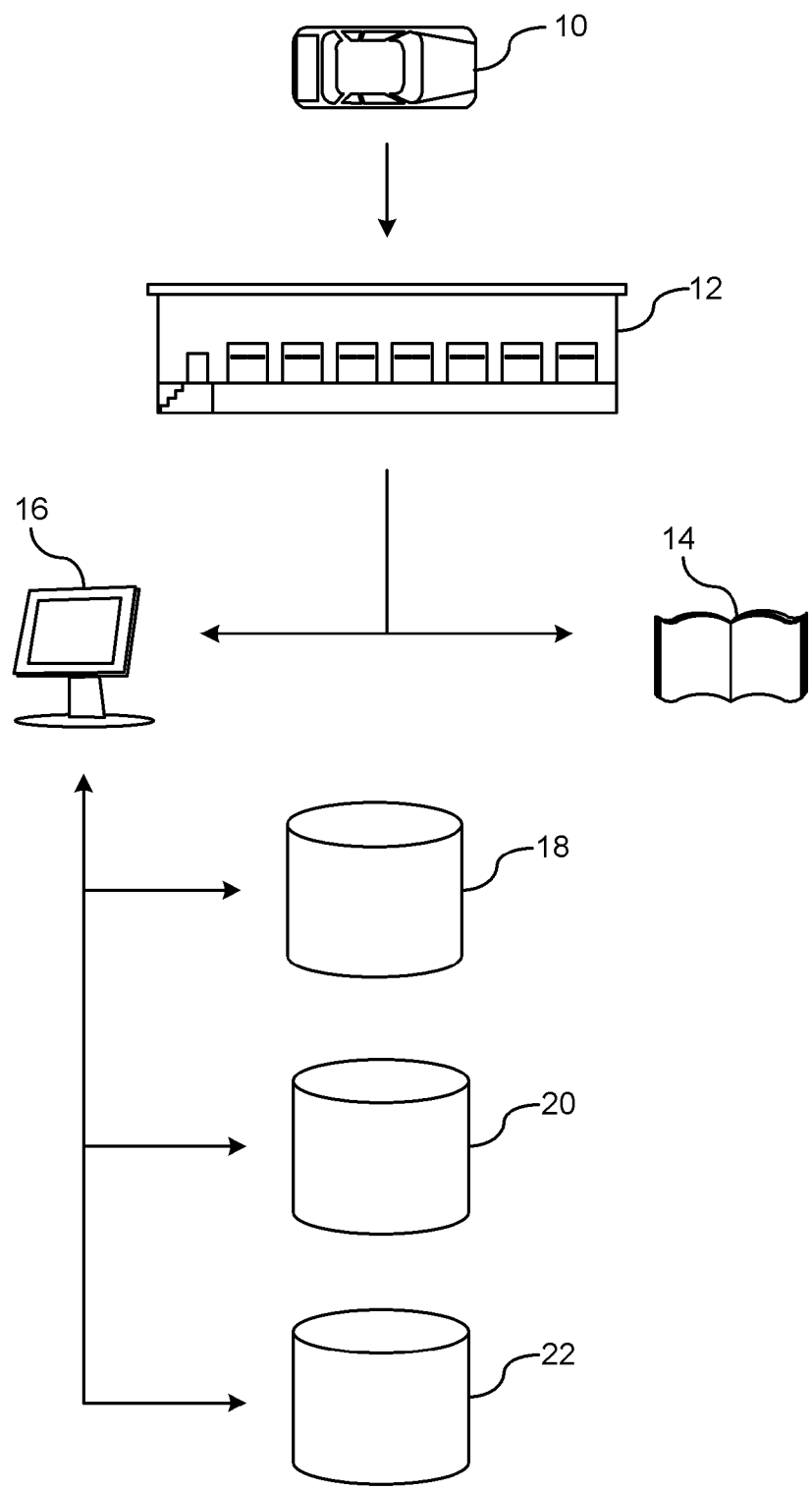
FIG. 1 is a service and warranty reporting flow diagram.

There is shown in FIG. 1 a service and warranty reporting flow diagram. A vehicle 10 represents any type of transportation vehicle that may experience problems requiring service repair. The vehicle 10 utilizes a service repair station 12, such as a service department at a dealership. The service technician at the service repair station will diagnose the root cause of the problem of the vehicle based on the reported problem. The symptoms exhibited by the vehicle are communicated to the service technician by the driver of the vehicle or the service technician may identify the potential issue through diagnostic trouble codes (DTCs).

DTCs are generated by an in-vehicle diagnostic processor that can assist a technician in identifying a problem with the vehicle. A DTC is a 5 digit alphanumeric code generated by the in-vehicle diagnostic processor when a problem is detected. When the in-vehicle diagnostic processor detects an error based on sensor inputs from one or more sensors, a diagnostic algorithm analyzes the sensed inputs and outputs a DTC as determined by the diagnostic algorithm. The DTC corresponds to a fault which can then be used to diagnose the problem. The DTC provides a starting point of where to diagnose the problem.

The service technician may utilize a service diagnostic repair manual 14 or other help via a computer 16. When the repair is complete, the service technician inputs the repair into a warranty reporting database 18. The warranty reporting database stores the repair history of all vehicles not only for the service station that is providing the service, but from all vehicle service stations that are part of a warranty reporting system.

The service technician may also utilize a structural taxonomy database 20 and a functional taxonomy database 22 to assist in determining the root cause of the problem. The structural taxonomy database 20 is structural listing of vehicle systems, subsystems, components, and subcomponents that are identified by their structural relation to one another. A hierarchical example of the structural taxonomy database 20 is shown in the table below.

TABLE 1

STRUCTURAL TAXONOMY

1 Powertrain
2 Chassis
3 HVAC & Powertrain Cooling
    31 HVAC & Powertrain Cooling Engine Compartment
    32 Front Interior HVAC Airflow
        321 Front Interior Airflow
            321.01 Front Heating Ventilation A/C Module
            321.02 Aspirator
            321.03 Module Housing/Case/Cover
            321.04 Valve
            321.05 Blower Speed Control
            321.06 Blower Motion & Scroll
            321.07 Evaporator
            321.08 Evaporator Sensor
            321.09 Heater Core
            321.10 Cooler
        322 Front Interior Control
    33 Rear Interior HVAC Airflow
    34 Front End Exterior Airflow
4 Interior
5 Body Structure
6 Exterior
7 Information & Control Each system shown in the table has a parent-child relationship with at least one subsystem (e.g., HVAC and Powertrain Cooling-Front Interior HVAC Control). Some subsystems may have a parent-child relationship with at least another subsystem (e.g., Front Interior HVAC Control-Front Interior Control). Each subsystem has a parent-child relationship with at least one component (e.g., Front Interior Control-Evaporator). Moreover, each component may have a parent-child relationship with at least one subcomponent. As a result, each of the linking relationships may be easily identified by viewing the structural taxonomy for a system or part.

The functional taxonomy database 22 identifies parts that have a functional relationship to a system or component in the structural taxonomy database 20. More importantly, the functional taxonomy database 22 supplements the structural taxonomy database 20 by identifying relationship between parts that may not be readily identifiable in the structural taxonomy database 20. An example of the functional taxonomy database 22 is shown in Table 2 below. Table 2 identifies components that are functionally related to the Evaporator listed in Table 1.

TABLE 2

FUNCTIONAL TAXONOMY

1 Sealing Component C11.06
2 Door Trim Assembly 432.10
3 Door Frame Applique C11.07.08

As is illustrated in Table 2, parts that are from entirely different classifications (e.g., and sealing component C11.06) are listed in comparison to evaporator 321.07. Such parts that would not be linked by the structural taxonomy database 20 are identified by the functional taxonomy database 22. As a result, the service technician can cooperatively utilize the structural taxonomy database 20 and the functional taxonomy database 22 for identifying a potential root cause of the problem that may not be readily apparent when analyzing the parts from a structural viewpoint.

Figure 2:
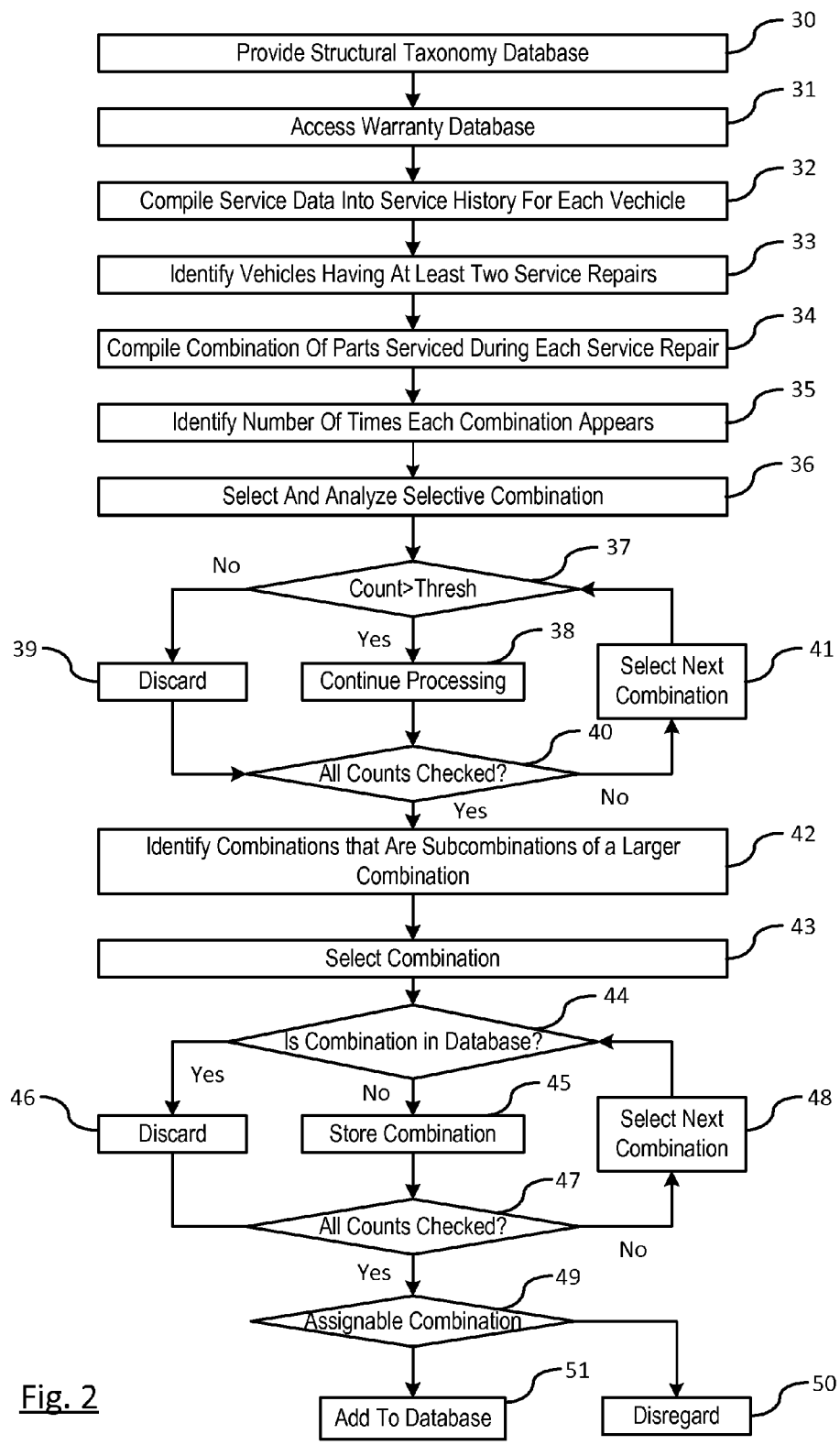
FIG. 2 is a flowchart for generating a functional taxonomy database.

FIG. 2 illustrates a flow chart for generating functional taxonomy database. In block 30, a structural taxonomy database is provided. The structural taxonomy database includes parts grouped by their structural relation to one another.

In block 31, a warranty database is accessed.

In block 32, service data is compiled into a service repair history for each vehicle.

In block 33, vehicles are identified having at least two service repairs performed within a predetermined period of time. Preferably, a vehicle identified that has been serviced on at least two different occasions within a predetermined period of time requires that the service dates be different for the vehicle. Parts that are serviced during different repairs for a vehicle but the repairs are close in time to each other are considered. As result, parts in two subsequent repairs for a respective vehicle separated by not more than a predetermined time are considered. A vehicle having repairs made within a predetermined period of time implies that the repairs are related. For example, the predetermined period of time may be repairs made with 90 days, 60 days, or even 30 days of one another. Alternatively, a vehicle having at least two service repairs performed on a same service date may be considered.

In block 34, combinations of parts identified in block 33 that were serviced during each service repair for each respective vehicle are compiled. Preferably, the sequence of the order that the parts were replaced (e.g. part A always replaced before part B) may be mandatory to identifying the combination. Alternatively, the order is not necessary so long as both parts are present in the combination.

In block 35, a sequence count is determined that identifies the number of times that each combination appears for the compiled data identified in block 34.

In block 36, a respective combination is selected and is analyzed for determining whether the count satisfies a predetermined threshold.

In block 37, a determination is made if the count for the selected combination is greater than the predetermined threshold. If the count is greater than the predetermined threshold, then the combination is stored for further processing in block 38. If the determination is made that the count for the selected combination is not greater than the predetermined threshold, then the combination is discarded in block 39.

In block 40, a determination is made whether all identified combinations have had counts checked against the predetermined threshold. If a combination remains unchecked, then routine proceeds to block 41, otherwise, the routine proceeds to block 42.

In block 41, a next combination is selected and the routine returns to block 37 to check the count against the predetermined threshold. Blocks 37, 39, 40, and 41 will be iteratively repeated until all combinations are selected and checked.

After all the counts have been checked, a determination is made whether any of the stored combinations are a subcombination to a larger combination that satisfies the predetermined threshold in block 42. For example, a combination is identified that includes a battery and an alternator. A determination is made if the combination, of the battery and alternator, is a subcombination to a larger combination such as a battery, alternator, and accessory drive belt. The determination is based on whether the larger combination (i.e., battery, alternator, drive belt) exists and whether the larger combination satisfies the predetermined threshold. If the combination is a subcombination of a larger combination and satisfies the threshold, then the larger combination is utilized for further processing. If a larger combination is not present or the large combination does not satisfy the predetermined threshold, then the combination as originally identified is utilized for further processing.

In block 43, a respective combination is selected for determining whether the combination is identified in the structural taxonomy database.

In block 44, a determination is made if the selected combination is already listed in the structural taxonomy database. If the combination is not listed in the structural taxonomy database, then the combination is stored for further processing in block 45. If the determination is made that the combination is already listed in the structural taxonomy database, then the combination is discarded in block 46.

In block 47, a determination is made whether all the identified combinations have been checked as to determine their presence in the structural taxonomy database. If any combination remains unchecked, then routine proceeds to block 48, otherwise, the routine proceeds to block 49.

In block 48, a next combination is selected and the routine returns to block 44 to check whether the selected combination is already listed in the structural taxonomy database. Blocks 44, 46, 47, and 48 will be iteratively repeated until all combinations are selected and checked.

In block 49, each stored combination in block 45 is provided to a subject matter expert. A subject matter expert has expert domain knowledge of the vehicle and its systems and components, and has knowledge of the failures that can occur with the vehicle. Such service matter experts may include engineers, technical experts, service and maintenance personnel, statisticians, and any other person having an in-depth knowledge of the systems and components of the vehicle. Typically, the count is determinative of whether the correlation between the parts is proper; however, in certain instances a high count for a combination may have occurred just "by chance". That is, it is coincidental that the combination has a count greater than the predetermined threshold. Therefore, the subject matter expert performs a final analysis to verify that there is a rational relationship between the parts of the combination. For example, the subject matter expert will review a combination that made it through the process such a compressor and a washer reservoir. The subject matter expert will determine whether there is a rational correlation between the two parts. The subject matter expert will evaluate structural and functional relationships that the subject matter expert is aware. From a laypersons perspective, the compressor and washer reservoir may not have any structural or functional dependency toward one another. However, the subject matter expert has in depth knowledge of the vehicle and the subject matter expert may identify an indirect relationship between the two parts of the combination such both parts utilizing the same wiring harness. As a result, the subject matter expert provides a "last check" before adding a combination to the functional taxonomy database.

If the subject matter expert determines that combination is a "chance correlation", then combination is disregarded in block 50. A "chance correlation" is when the subject matter expert determines there is not rational correlation between the parts. If the subject matter expert determines that the combination is an assignable correlation, then the routine proceeds to block 51.

In block 51, the combination is added to the functional taxonomy database.

Figure 3:
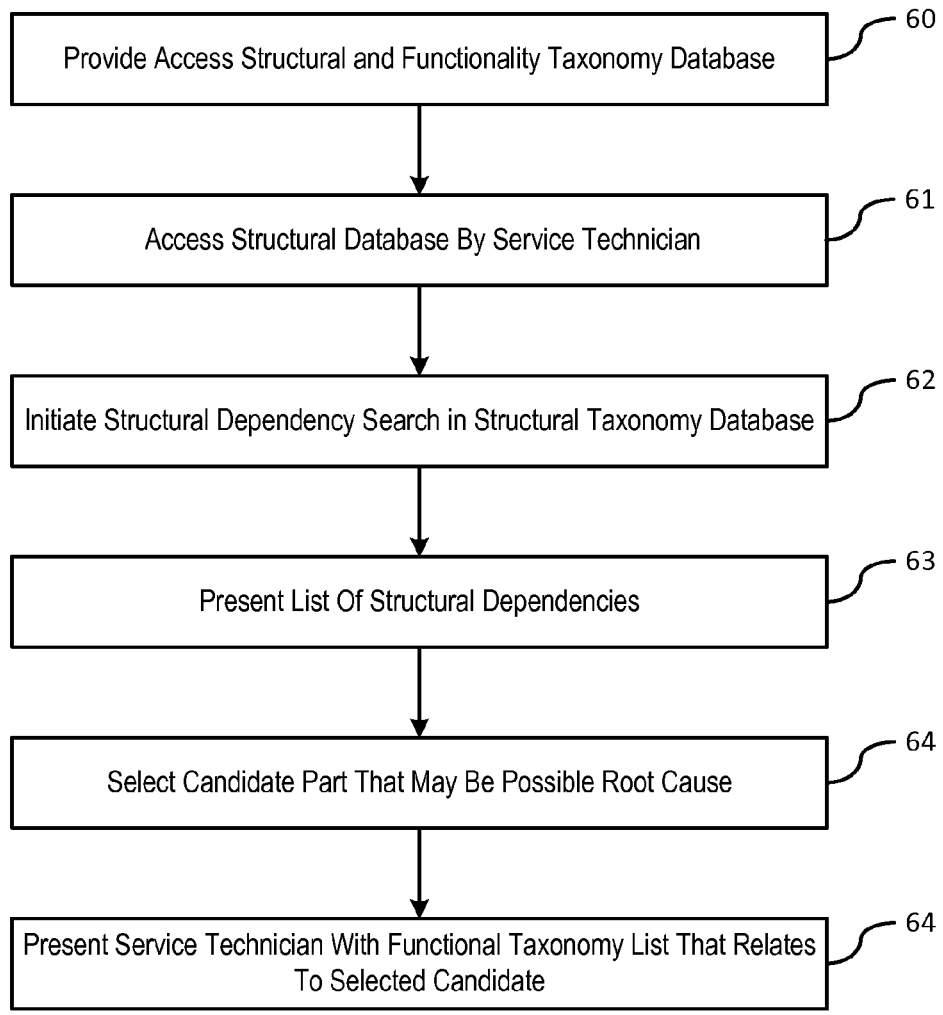
FIG. 3 is a flowchart for utilizing the functional taxonomy database for diagnosing a root cause of a problem.

FIG. 3 illustrates a flow diagram for utilizing the functionality taxonomy database to diagnose a root cause of the identified problem.

In block 60, a structural taxonomy database and a functional taxonomy database are provided access to a service technician via a computer. The databases may exist on the hard drive of the computer that are periodically updated or may be accessed via an online communication link.

In block 61, the service technician accesses the structural taxonomy database via the computer.

In block 62, the service technician initiates a search for structural dependencies in a structural taxonomy database via a computer by entering a system or component.

In block 63, the service technician is presented with a list of structural dependencies relating to the system or component entered via the computer.

In block 64, the service technician selects a candidate part that the service technician determines may be the root cause of the problem or possibly related to the cause of the problem.

In block 65, the service technician is presented with a functional taxonomy list of parts that functionally relate to the selected candidate. The parts listed in functional taxonomy database that are generated by selecting the candidate in the structural taxonomy database are made available to the service technician to assist in diagnosing the root cause of the problem. As a result, the functional linking of the parts between the structural and functional taxonomy databases provide additional candidates that would otherwise not be obvious to the service technician as possible root causes.

While certain embodiments of the present invention have been described in detail, those familiar with the art to which this invention relates will recognize various alternative designs and embodiments for practicing the invention as defined by the following claims.

What is claimed is:

1. A method of enhancing service diagnostics for root cause analysis of an identified problem in a vehicle by generating a functional taxonomy database that is utilized in cooperation with a structural taxonomy database, the structural taxonomy database identifying structural relationships between parts of a vehicle, and the functional taxonomy database identifying functional relationships between parts of the vehicle, the method comprising the steps of:

obtaining service data of previously serviced vehicles from a memory storage device, the service data identifying parts serviced on the vehicles during a respective service repair;

compiling the service data based on a history of service repairs for each vehicle;

identifying each vehicle within the compiled service data having at least two service repairs performed within a predetermined period of time;

identifying combinations of parts serviced for each vehicle;

determining a count indicating a number of times each combination appears in the compiled service data for the identified vehicles having at least two service repairs;

identifying the combinations having counts greater than a predetermined threshold;

determining whether any of the combinations having counts greater than the predetermined threshold are present in the structural taxonomy database;

selecting only the combinations that are not present in the structural taxonomy database and have counts greater than the predetermined threshold; and updating a functional taxonomy database by assigning the selected combinations to the function taxonomy database, wherein the functional taxonomy database and the structural taxonomy database are made available to a service technician via a computer to assist the service technician in diagnosing the root cause.

2. The method of claim 1 wherein in the step of identifying the combinations having counts greater than a predetermined threshold further comprises the step of:

determining whether each identified combination is a subcombination of a larger combination that satisfies the predetermined threshold, wherein if the larger combination satisfies the count, then the structural taxonomy database is queried to determine if the larger combination is present therein.

3. The method of claim 2 wherein the larger combination is updated in the functional taxonomy database in response to the larger combination not being present in the structural taxonomy database.

4. The method of claim 1 wherein a subject matter expert reviews the combinations prior to being added to the functional taxonomy database for verifying an acceptable correlation between the subcomponents of the combination.

5. The method of claim 4 wherein combinations having counts greater than the predetermined threshold that are present in the structural taxonomy database are discovered.

6. The method of claim 1 wherein using the functional taxonomy database and the structural taxonomy database to diagnose the root cause of the identified problem further comprises the steps of:

the service technician initiating a search for structural dependencies using the structural taxonomy database on a computer;

generating a list of parts that are structurally dependent on the searchable part;

selecting a part from the list of parts;

generating a list of parts in the functional taxonomy database that are functionally related to the selected part of the structural taxonomy database; and the service technician identifying a part in the functional taxonomy database that is a potential candidate of the identified problem.

7. The method of claim 1 wherein the predetermined period of time is less than 90 days.

8. The method of claim 1 wherein the predetermined period of time is less than 60 days.

9. The method of claim 1 wherein the predetermined period of time is less than 30 days.

10. The method of claim 1 wherein an identified combination is based on specific repair sequence in replacing the parts.

11. The method of claim 1 wherein the predetermined threshold is at least 5.

12. The method of claim 1 wherein the combination includes at least two parts.

13. The method of claim 1 wherein the selected combination of parts from the structural taxonomy database have a hierarchical relationship.

* * * * *